United States Patent [19]
Ernst

[11] 4,243,325
[45] * Jan. 6, 1981

[54] OPTICAL DISTANCE MEASURING INSTRUMENT

[75] Inventor: Alfons Ernst, Traunreut, Fed. Rep. of Germany

[73] Assignee: Dr. Johannes Heidenhain GmbH, Traunreut, Fed. Rep. of Germany

[*] Notice: The portion of the term of this patent subsequent to Oct. 16, 1996, has been disclaimed.

[21] Appl. No.: 971,249

[22] Filed: Dec. 20, 1978

[30] Foreign Application Priority Data

Dec. 30, 1977 [DE] Fed. Rep. of Germany ....... 2758853

[51] Int. Cl.³ .................... G01B 11/00; G01B 11/02; G02B 27/17
[52] U.S. Cl. .................... 356/372; 350/272; 356/387
[58] Field of Search ........... 356/372, 380, 386–387; 250/236 E, 237 R, 224; 350/272

[56] References Cited

U.S. PATENT DOCUMENTS

| | | | |
|---|---|---|---|
| 2,524,807 | 10/1950 | Kallman | 356/4 |
| 2,565,745 | 8/1951 | Skalka | 250/233 |
| 3,254,226 | 5/1966 | Bobula et al. | 356/387 |
| 3,950,096 | 4/1976 | Aeschlimann et al. | 356/1 |
| 4,171,160 | 10/1979 | Ernst | 356/375 |

FOREIGN PATENT DOCUMENTS

| | | |
|---|---|---|
| 1202012 | 9/1965 | Fed. Rep. of Germany . |
| 2157813 | 3/1973 | Fed. Rep. of Germany . |
| 1623323 | 12/1975 | Fed. Rep. of Germany . |
| 2448219 | 4/1976 | Fed. Rep. of Germany . |
| 2758853 | 8/1979 | Fed. Rep. of Germany . |
| 2302512 | 9/1976 | France . |

*Primary Examiner*—John K. Corbin
*Assistant Examiner*—Wm. H. Punter
*Attorney, Agent, or Firm*—Hume, Clement, Brinks, Willian & Olds, Ltd.

[57] ABSTRACT

An instrument for measuring a dimension of an object is disclosed including a rotatable disc defining at least one translucent involute slit proceeding from a base circle centered at the center of rotation of the disc and a diaphragm mounted adjacent the disc and defining a linear slit arranged on a line tangent to the base circle. The intersection of the involute slit and the diaphragm slit forms a translucent overlap zone, and an image of the object is projected onto the disc or the diaphragm in the region of the diaphragm slit oriented such that the dimension to be measured is parallel to the diaphragm slit.

11 Claims, 3 Drawing Figures

OPTICAL DISTANCE MEASURING INSTRUMENT

BACKGROUND OF THE INVENTION

The present invention relates to a device for measuring a dimension of an object by means of an opaque, rotating disc provided with at least one translucent spiral slit, and an opaque diaphragm provided with a translucent, substantially linear slit which is arranged adjacent the disc in such a way that a translucent overlap zone is formed between the spiral and linear slits. This overlap zone moves along the linear slit as the disc rotates. Optical means are provided for generating an image of the object being measured on the diaphragm or the disc with the dimension to be measured falling in the zone of the linear slit and parallel to this slit. Also included is a detector for measuring the intensity of light passing through the overlap zone and a circuit for evaluating the measuring signal provided by the detector.

In one known measuring device of this type, the translucent linear slit of the diaphragm is arranged radially to intersect in each case one of the translucent spiral slits having a curvature which is not described in detail (U.S. Pat. No. 3,254,226, FIG. 3). The spiral slits intersect the linear slit at angles that are less than 90° during the rotation of the disc. The overlap zone, therefore, is not rectangular in form, and this results in a measuring signal which rises in a relatively slow manner as the edge of the object is scanned, a condition which may reduce the accuracy of the measurement.

Another known device utilizes a slit in the diaphragm which is made nonlinear in order to make the measurement linear such that the position of the overlap zone along the slit is strictly proportional to the angle of rotation of the disc (German Pat. No. 16 23 323). Such a diaphragm, however, is in practice difficult to manufacture. Furthermore, the slits of this device also intersect at angles other than 90°, with the aforementioned disadvantages.

Another known device utilizes a diaphragm having a linear slit which is arranged radially adjacent the disc. A sequence of rectangular openings positioned along a spiral path is provided instead of a spiral slit in the disc (U.S. Pat. No. 3,254,226, FIG. 1). The overlap zone of such an opening with the linear slit is, to be sure, rectangular, but the accuracy of this arrangement is considerably limited by reason of the opaque regions between successive openings in the rotating disc.

SUMMARY OF THE INVENTION

The present invention is directed to a measuring instrument, of the type previously mentioned, which delivers a measuring signal that represents the measured dimension of the object with high accuracy.

This is achieved by arranging the spiral slit of the disc in the form of an involute which proceeds from a base circle centered at the center of rotation of the disc, and further, by arranging the linear slit of the diaphragm substantially along a tangent to the base circle of the involute slit of the disc.

One important advantage of using an involute slit on the rotating disc is that such a slit intersects the linear slit of the diaphragm at substantially a right angle for all points along the slit. Furthermore, the position of the overlap zone between the involute slit and the linear slit is strictly proportion to the angle of rotation of the disc. This follows from the geometric properties of an involute, which can be regarded as the path or curve traced by the end of a tensioned thread as it is unwound from a base circle.

Therefore, the length of a line drawn tangent to the base circle from any point on such an involute is equal to the radius of curvature of the involute at this point. The combination of an involute slit and a tangentially arranged linear slit provides a very good approximation of a rectangular overlap zone, especially when the linear slit of the diaphragm is arranged at a distance R from the point of contact of the tangent to the base circle, which distance is great with respect to the width c of the linear slit.

It is a known practice to determine the dimension of an object from the duration of an approximately rectangular pulse or measuring signal. The accuracy of such a measurement is limited, however, by reason of fluctuations in the rotational velocity of the disc. A preferred embodiment of the invention utilizes means for scanning a reference pattern on the disc to provide signals representing the angular position of the disc. This approach provides a measuring result which is independent of fluctuations in the rotational velocity of the disc.

In order to be able to carry out measurements rapidly and precisely, a high scanning rate is desired, which can be achieved by arranging a number of involute slits on the disc. In order to obtain an allocation between the commencement of the individual involutes and the measuring signal, as well as to obtain a fine angular subdivision, a reference pattern is preferably provided on the disc. This pattern preferably comprises a uniform grid pattern of substantially radial, translucent grid marks distributed along an arc of the disc and a marking pattern of individual translucent slits or groups of slits associated in each case with one of the spiral slits. Furthermore, means are preferably provided for scanning the reference pattern by means of two detectors which provide a grid signal and a marking signal, respectively.

With the aid of a high frequency grid signal, relatively simple means can be used to precisely evaluate the measuring signal. For example, a counter controlled by the measuring signal may be used to count pulses of the grid signal to generate a reference signal representing the dimension of the measured object.

The invention, together with further objects and attendant advantages, will be best understood by reference to the following detailed description taken in conjunction with the accompanying drawings.

DETAILED DESCRIPTION OF A PREFERRED EMBODIMENT

Figure 1:
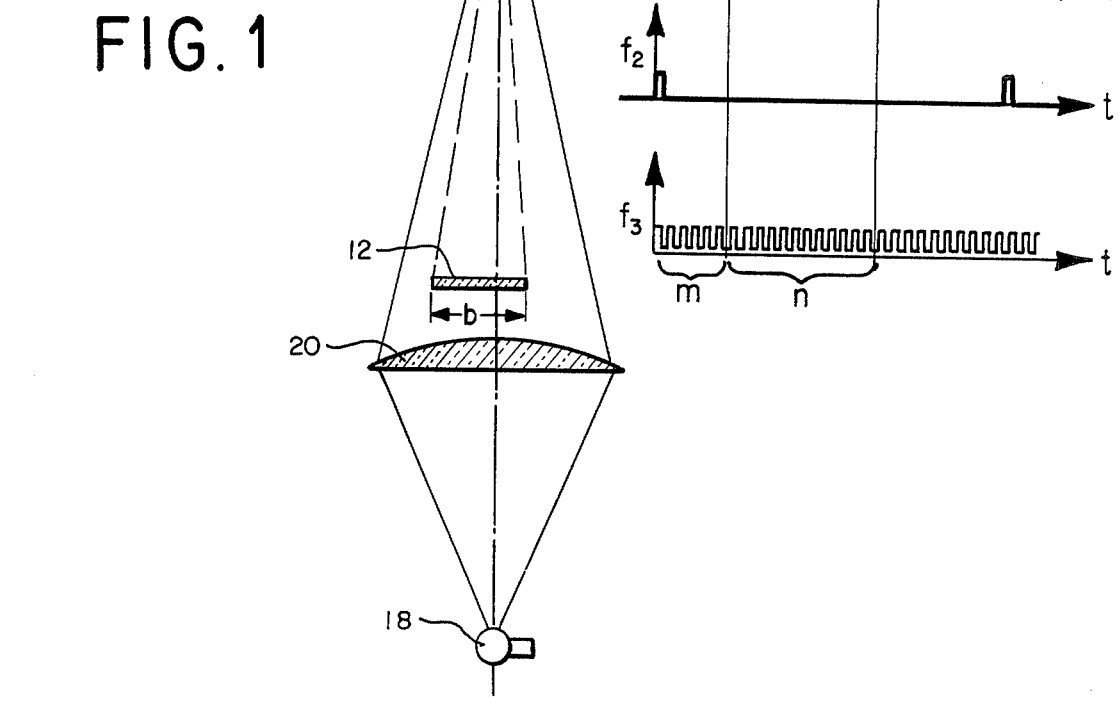
FIG. 1 is a simplified sectional view of a preferred embodiment of the invention.

Referring now to the drawings, a preferred embodiment of the present invention is shown in FIG. 1 and designated generally by the reference number 10. This embodiment will be described as it is used to measure the width b of an object 12. The object 12 is illuminated by light from a light source which may include an incandescent lamp 18 and a condenser lens 20 as shown.

An image of this object 12 is formed on the diaphragm 16 by the lens 22. The light source should be chosen to provide high contrast lighting. In the arrangement shown the body 12 is placed on the optical line between lamp 18 and image 14, but it should be understood that the lamp 18 can be arranged on the same side of the object 12 as the image 14. In this case the image is formed from reflected light and lamp 18 can be integrated in a casing with the other components of the device 10.

Figure 2:
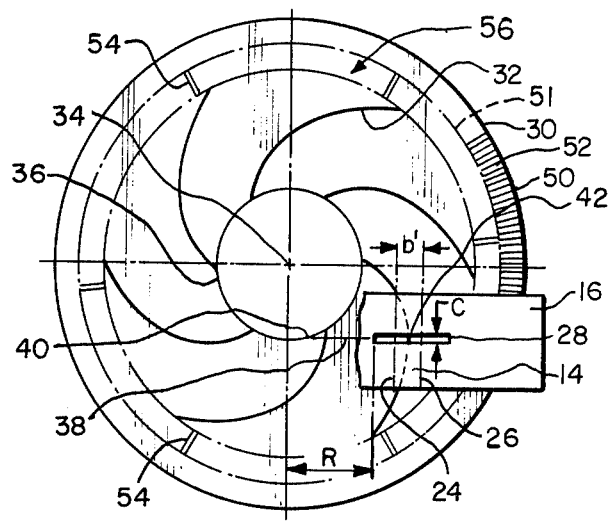
FIG. 2 is a partial sectional view taken along line A—A of FIG. 1 showing the disc and diaphragm of the preferred embodiment of FIG. 1.

The object 12 illuminated by the lamp 18 is sharply projected with the aid of a lens 22 onto the diaphragm 16. In FIG. 2 the image 14 is represented as an area between the dotted edge lines 24 and 26. Perpendicular to these edge lines 24 and 26 there is provided in the diaphragm 16 a straight, translucent slit 28 of a width c. Closely behind the diaphragm 16 there rotates a disc 30 driven by a motor 31. This disc has several spiral, translucent slits 32 in the form of involutes. These involutes proceed from a base circle 36 centered at the center of rotation 34 of the disc 30 (see FIG. 2).

The position of the diaphragm 16 is established in such a way that the straight slit 28 runs along a tangent 38 to the base circle, at a distance R from the contact point 40 between the tangent line 38 and the base circle 36. The distance R is much larger than the width c of the slit 28.

Figure 3:
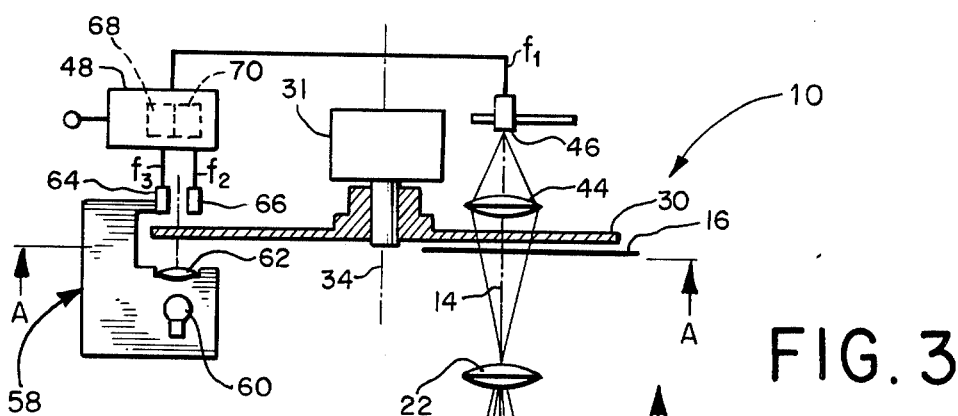
FIG. 3 is a wave form diagram showing signals generated by the embodiment of FIG. 1.

In the region at which the straight translucent slit 28 intersects with one of the involute translucent slits 32 a translucent overlap zone 42 is formed. Otherwise, the combination of diaphragm 16 and disc 30 is impermeable to light. Since the overlap zone 42 moves along the straight slit 28 as the disc turns, it is possible to scan the part of image 14 projected onto this slit 28. For this purpose behind the disc 30 there is arranged a lens 44 that collects the light passing through the overlap zone 42 onto a photosensitive detector 46. The detector 46 delivers a measuring signal $f_1$ to a circuit 48. FIG. 3 represents the signal $f_1$ as it changes in time with scanning of the image 14. Since the region between the edge lines 24 and 26 is darker than the adjoining regions by virtue of the shadowing of the lamp 18 by the object 12, the signal $f_1$ inside this region has a lower amplitude. Between a circle 51 on the disc 30 and the edge of the disc there is provided a grid pattern 50 with translucent, radially running slits 52 in the manner of a radial grid. In addition, individual translucent slits 54 allocated to individual involute slits 32 form a marking pattern 56 on disc 30. These slits 54 mark in each case the commencement of the overlapping of an involute slit 32 with the straight slit 28 of the diaphragm 16.

The grid pattern 50 and also the marking pattern 56 are scanned by a scanning arrangement 58. For this the disc 30 is illuminated in the zone of this pattern 50, 56 by a light source 60 via a lens 62 and the light passing through the disc 30 is picked up by two detectors 64 and 66. The detector 64 is oriented to scan the grid pattern 50 and it provides a grid signal $f_3$, while the detector 66 scans the marking pattern 56 to provide a marking signal $f_2$ to the circuit 48. In FIG. 3 the time course of the two signals $f_2$ and $f_3$ is shown.

The relatively high frequency of the grid signal $f_3$ provides a plurality of rectangular pulses in each measuring period. It is possible by a simple counting of these pulses to measure the width b' of the image 14 and by means of the known enlargement factor, the width b of the object 12. For this there is provided in the circuit 48 a counter 68 which adds the pulses of the grid signal $f_3$ as long as $f_1$ has a low amplitude (n pulses in FIG. 3). Correspondingly a second counter 70 can be provided that begins to count the pulses of the division signal $f_3$ as soon as a pulse arises in the marking signal $f_2$ and terminates the counting as soon as $f_1$ takes on a low amplitude (m pulses in FIG. 3). From this it is possible to obtain the absolute position of the body.

With this preferred embodiment it is possible to carry out the measurement of the position of edges of an object without physical contact and with a high measuring frequency of, for example, 50 or 100 measurements per second. The measuring result is available digitally with a high ratio of resolution to the total measured length of, for example, 10,000:1. The enlargement factor can be varied within wide limits. The device is of simple construction and economical to manufacture.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

I claim:

1. In a device for measuring a dimension of an object, said device including first means for defining an opaque rotatable disc provided with at least one translucent spiral slit; second means for defining an opaque diaphragm provided with a translucent slit, wherein the diaphragm is arranged to form an overlap zone between the diaphragm slit and the spiral slit, which zone moves along the diaphragm slit as the disc turns; means for generating an image of the object near the diaphragm slit with the dimension to be measured in the region of and substantially parallel to the diaphragm slit; means responsive to the light passing through the overlap zone for generating a measuring signal; and means for evaluating the measuring signal, the improvement comprising:

the spiral slit of the disc is formed substantially in the shape of an involute that proceeds from a base circle centered at the center of rotation of the disc; and the diaphragm slit is substantially linear and is arranged substantially on a line tangent to the base circle of the spiral slit of the disc.

2. The device of claim 1 wherein the distance between the diaphragm slit and the base circle along the tangent line is substantially greater than the width of the diaphragm slit.

3. The device of claim 1 or 2 further including a reference pattern formed on the disc and means for scanning the reference pattern to measure the angular position of the disc.

4. The device of claim 3 wherein the reference pattern comprises a grid pattern of radial translucent slits distributed along an arc of the disc and a marking pattern of markers, each of which is allocated to one of the spiral slits of the disc, and wherein the scanning means comprises a first detector arranged to scan the grid pattern and a second detector arranged to scan the marking pattern.

5. The device of claim 3 or 4 wherein the evaluating means includes a counter responsive to the measuring signal and to the scanning means for generating a signal representative of the measured dimension of the object.

6. A device for measuring a dimension of an object, said device comprising:
- a substantially opaque disc defining a translucent, curved region, said translucent curved region formed substantially in the shape of an involute that proceeds from a base circle;
- means for rotatably mounting the disc;
- a substantially opaque diaphragm defining a translucent linear region, said diaphragm positioned adjacent the disc such that the linear region is substantially tangent to the base circle and a portion of the curved region overlaps a portion of the linear region to form an overlap zone, which zone moves along the linear region as the disc turns;
- means for generating an image of the object near the linear region such that the dimension to be measured is oriented substantially parallel to the linear region;
- means, responsive to light passing through the overlap zone, for generating a measuring signal; and
- means for evaluating the measuring signal.

7. The device of claim 6 wherein the distance between the linear region and the base circle along the tangent line is substantially greater than the width of the linear region transverse to the tangent line.

8. The device of claim 6 or 7 further including a reference pattern formed on the disc and means for scanning the reference pattern to measure the angular position of the disc.

9. The device of claim 8 wherein the reference pattern comprises a grid pattern distributed along an arc of the disc and a marking pattern including at least one marker associated with the curved region, wherein the scanning means includes a first detector positioned to scan the grid pattern and a second detector positioned to scan the marking pattern.

10. The device of claim 8 wherein the evaluating means includes a counter responsive to the measuring signal and to the scanning means for generating a signal representative of the measured dimension of the object.

11. A device for measuring a dimension of an object, said device comprising:
- an opaque disc defining a plurality of translucent, involute shaped slits proceeding from a base circle centered at a rotation point of the disc;
- means for rotatably mounting the disc;
- an opaque diaphragm defining a translucent, linear slit;
- means for mounting the diaphragm adjacent the disc such that the linear slit is oriented tangent to the base circle and a portion of the linear slit overlaps a portion of the involute shaped slits to form an overlap zone which moves along the linear slit as the disc turns, said diaphragm positioned such that the distance between the base circle and the end of the linear slit nearest the base circle is substantially larger than the width of the linear slit transverse to the tangent line;
- a grid pattern formed along an arc of the disc;
- a marker pattern formed on the disc, said marker pattern including a plurality of markers, each marker positioned in a predetermined spatial relationship to a respective one of the plurality of involute shaped slits;
- means, responsive to light passing through the overlap zone, for generating a measuring signal;
- a first detector positioned to scan the grid pattern to generate a grid signal;
- a second detector positioned to scan the marker pattern to generate a marker signal; and
- counter means, responsive to the measuring signal, the grid signal, and the marker signal, for generating a counter signal representative of the measured dimension of the object.

\* \* \* \* \*